US012577413B2

(12) United States Patent
Zhang et al.

(10) Patent No.: US 12,577,413 B2
(45) Date of Patent: Mar. 17, 2026

(54) ANTI-MICROBIAL SURFACES AND RELATED METHODS

(71) Applicant: Henkel AG & Co. KGaA, Duesseldorf (DE)

(72) Inventors: Bong June Zhang, Newton, MA (US); Miguel Galvez, Danvers, MA (US)

(73) Assignee: Henkel AG & Co. KGaA, Duesseldorf (DE)

( * ) Notice: Subject to any disclaimer, the term of this patent is extended or adjusted under 35 U.S.C. 154(b) by 0 days.

(21) Appl. No.: 17/469,224

(22) Filed: Sep. 8, 2021

(65) Prior Publication Data

US 2022/0235232 A1 Jul. 28, 2022

Related U.S. Application Data

(60) Provisional application No. 63/075,654, filed on Sep. 8, 2020.

(51) Int. Cl.

| | |
|---|---|
| ***C09D 5/14*** | (2006.01) |
| ***C08K 3/015*** | (2018.01) |

(Continued)

(52) U.S. Cl.

CPC ................ *C09D 5/14* (2013.01); *C08K 3/015* (2018.01); *C08K 3/08* (2013.01); *C09D 7/61* (2018.01);

(Continued)

(58) Field of Classification Search

CPC ... B01J 20/0237; B01J 20/0233; C23C 18/38; C23C 18/31; A01P 1/00;

(Continued)

(56) References Cited

U.S. PATENT DOCUMENTS

| | | | |
|---|---|---|---|
| 9,631,118 | B2 | 4/2017 | Park et al. |
| 10,070,651 | B2 | 9/2018 | Santra et al. |

(Continued)

FOREIGN PATENT DOCUMENTS

| | | | |
|---|---|---|---|
| CN | 107580636 A | | 1/2018 |
| CN | 109753185 A | * | 5/2019 |

(Continued)

OTHER PUBLICATIONS

Lin et al., Trap and release of bisphenol-A, 2-naphthol, and doxepin using a 1-hexadexylamine-copper(II)-amine functionalized indium-tin-oxide electrode, 2016, Chemical Engineering Journal, 295, pp. 245-253 (Year: 2016).*

(Continued)

*Primary Examiner* — Stefanie J Cohen
(74) *Attorney, Agent, or Firm* — Steven C. Bauman

(57) ABSTRACT

According to some embodiments, an anti-microbial composition (e.g., an anti-microbial coating), and related methods, are generally described. The anti-microbial composition may be used to kill, inhibit growth, mitigate, and/or inhibit retention of one or more microbes and/or bacteria. The anti-microbial properties of the composition may be provided by a microbial inhibition material, which comprises a silane compound (e.g., a first silane compound) functionalized with a metal ion. The composition may also include a fingerprint inhibition material, which comprises a silane compound (e.g., a second silane compound) that may preferably be hydrophobic. The fingerprint inhibition material may comprise an invisible fingerprint material and/or an anti-fingerprint material. The invisible fingerprint material is configured to hide fingerprints by making them optically less visible (e.g., to the human eye), while the anti-fingerprint material may be configured to suppress the retaining of fingerprints. In addition to providing anti-microbial and (Continued)

anti-fingerprint properties, the composition may also be chemically inert, mechanically robust, and/or optically transparent.

11 Claims, 8 Drawing Sheets

(51) Int. Cl.
*C08K 3/08* (2006.01)
*C09D 7/61* (2018.01)
*C09D 183/04* (2006.01)

(52) U.S. Cl.
CPC .... *C09D 183/04* (2013.01); *C08K 2003/0806* (2013.01); *C08K 2003/085* (2013.01)

(58) Field of Classification Search
CPC .... C08K 2003/085; C08K 3/08; C08K 3/015; C08K 2003/0806; C09D 5/1675; C09D 183/06; C09D 183/02; C09D 5/14; C09D 7/61; C09D 183/04; C09D 7/60; C09C 1/3081
USPC .......................................................... 106/15.05
See application file for complete search history.

(56) References Cited

U.S. PATENT DOCUMENTS

| | | | | |
|---|---|---|---|---|
| 10,147,858 | B1 * | 12/2018 | Huang | H01L 25/0753 |
| 2004/0029834 | A1 * | 2/2004 | Schiestel | C09D 183/04 514/63 |
| 2008/0261024 | A1 | 10/2008 | Xenopoulos et al. | |
| 2014/0370306 | A1 | 12/2014 | Park et al. | |
| 2015/0315388 | A1 * | 11/2015 | Park | C09D 7/60 427/404 |
| 2018/0141854 | A1 | 5/2018 | Huang | |
| 2019/0367773 | A1 | 12/2019 | Galvez et al. | |
| 2020/0048495 | A1 | 2/2020 | Galvez et al. | |
| 2020/0085059 | A1 | 3/2020 | Chin et al. | |
| 2021/0265432 | A1 * | 8/2021 | Kato | H05B 33/12 |

FOREIGN PATENT DOCUMENTS

| | | | |
|---|---|---|---|
| JP | 2014237227 | A | 12/2014 |
| KR | 20140029029 | A | 3/2014 |
| WO | 2009045302 | A2 | 4/2009 |
| WO | 2014084480 | A1 | 6/2014 |
| WO | WO 2020/097288 | A1 | 5/2020 |
| WO | WO 2020/136552 | A1 | 7/2020 |
| WO | 2019227010 | A1 | 1/2021 |

OTHER PUBLICATIONS

Agrawal et al., Durable easy-cleaning and antibacterial cotton fabrics using fluorine-free silane coupling agents and CuO nanoparticles, Sep. 2019, Nano Materials Science, 2, pp. 281-291 (Year: 2019).*

Machine translation of CN 109753185 A originally published May 2019 to Gong et al. (Year: 2019).*

Invitation to Pay Additional Fees for International Application No. PCT/US2021/049417 mailed Nov. 24, 2021.

International Search Report and Written Opinion for International Application No. PCT/US2021/049417 mailed Feb. 15, 2022.

Chen et al., Silanization of solid surfaces via mercaptopropylsilatrane: a new approach of constructing gold colloid monolayers. RSC Adv. Sep. 19, 2014;4(87):46527-35.

Chen et al., Structure-controlled solventless thermolytic synthesis of uniform silver nanodisks. Inorg Chem. Dec. 26, 2005;44(26):9817-22. doi: 10.1021/ic051246d.

Goulet et al., New insights into Brust-Schiffrin metal nanoparticle synthesis. J Am Chem Soc. Jul. 21, 2010;132(28):9582-4. doi: 10.1021/ja104011b.

Jeong et al., Formation of Ag(I) Thiolate-layered Materials and Thiol-capped Ag Nanoparticles by the Reduction of Silver Nitrate with Sodium Borohydride in the Presence of Thiol: Control of the Selectivity by the Ag+ to Thiol Mole Ratio. Bull Korean Chem Soc. May 2016;37(5):736-9.

Kolthoff et al., Amperometric Titration of Mercaptans with Silver Nitrate Using the Rotating Platinum Electrode. Ind Eng Chem Anal Ed. Mar. 1, 1946;18(3):161-2.

Extended European Search Report for EP21867494 dated Aug. 7, 2024, 4 pages.

* cited by examiner

| Test organism(s) | Escherichia coli ATCC 8739 |
|---|---|
| Concentration of bacteria (cells/mL) | 1.8x10^6 |
| Volume of test inoculum (mL) | 0.2 |
| $U_0$ | 4.35 |
| Ut | 5.51 |
| At | -0.20 |
| B (cells/$cm^2$) | 3.3x10^5 |
| C (cells/$cm^2$) | 0.63 |
| R | 5.7 |
| *The antibacterial activity rate (%) | >99.9 |

a. U0: the number of logarithm of the viable bacteria of the untreated sample after inoculation
b. Ut: the number of logarithm of the viable bacteria of the untreated sample after 24 hrs
c. At the number of logarithm of the viable bacteria of the treated sample after 24 hrs
d. R: the value of antimicrobial acitivity, R= Ut - At

FIG. 4A

| Test organism(s) | Escherichia coli ATCC 8739 |
|---|---|
| Concentration of bacteria (cells/mL) | 1.8x10^6 |
| Volume of test inoculum (mL) | 0.2 |
| $U_0$ | 4.35 |
| Ut | 5.51 |
| At | -0.20 |
| B (cells/$cm^2$) | 3.3x10^5 |
| C (cells/$cm^2$) | 0.63 |
| R | 5.7 |
| *The antibacterial activity rate (%) | >99.9 |

a. U0: the number of logarithm of the viable bacteria of the untreated sample after inoculation
b. Ut: the number of logarithm of the viable bacteria of the untreated sample after 24 hrs
c. At the number of logarithm of the viable bacteria of the treated sample after 24 hrs
d. R: the value of antimicrobial acitivity, R= Ut - At

FIG. 4B

| Test organism(s) | Escherichia coli ATCC 8739 |
|---|---|
| Concentration of bacteria (cells/mL) | 1.5x10^6 |
| Volume of test inoculum (mL) | 0.2 |
| $U_0$ | 4.33 |
| Ut | 5.60 |
| At | -0.20 |
| B (cells/cm²) | 4.0x10^5 |
| C (cells/cm²) | 0.63 |
| R | 5.8 |
| *The antibacterial activity rate (%) | >99.9 |

a. U0: the number of logarithm of the viable bacteria of the untreated sample after inoculation
b. Ut: the number of logarithm of the viable bacteria of the untreated sample after 24 hrs
c. At the number of logarithm of the viable bacteria of the treated sample after 24 hrs
d. R: the value of antimicrobial acitivity, R= Ut - At

FIG. 5A

| Test organism(s) | Escherichia coli ATCC 8739 |
|---|---|
| Concentration of bacteria (cells/mL) | 1.5x10^6 |
| Volume of test inoculum (mL) | 0.2 |
| $U_0$ | 4.33 |
| Ut | 5.60 |
| At | -0.20 |
| B (cells/cm²) | 4.0x10^5 |
| C (cells/cm²) | 0.63 |
| R | 5.8 |
| *The antibacterial activity rate (%) | >99.9 |

a. U0: the number of logarithm of the viable bacteria of the untreated sample after inoculation
b. Ut: the number of logarithm of the viable bacteria of the untreated sample after 24 hrs
c. At the number of logarithm of the viable bacteria of the treated sample after 24 hrs
d. R: the value of antimicrobial acitivity, R= Ut - At

FIG. 5B perfluoropolyether silane : ethylene-diamine tri-alkoxy silane

| | | AGC surepco† | 4:1 | 2:2 | 1:4 |
|---|---|---|---|---|---|
| Molecular weight (g/mol) | | >4000 | | | |
| Contact Angle | $H_2O$ | 108° | 107° | 125° | 132° |
| | $CH_2I_2$ | 90° | 86° | 90° | 97° |
| Surface energy (dyne/cm) | | ~12.5 | ~15 | ~11 | ~8.6 |

† Soluble in fluorinated solvents (Vertel)

FIG. 6A

| perfluoropolyether silane : ethylene-diamine tri-alkoxy silane (by wt%) | water | $CH_2I_2$ | Surface energy (cm/dyne) | Gloss @ 60 ° |
|---|---|---|---|---|
| Control† | 108 ° -110 ° | 90 ° - 91 ° | 14 | 2.4 ± 1 |
| 1 : 2.5 | 105 ° - 110 ° | 85 ° - 88 ° | 15 | 2.4 ± 1 |
| 1 : 4 | 116 ° - 126 ° | 95 ° - 98 ° | 12 | 2.5 ± 1 |
| 1 : 1 | 126 ° - 130 ° | 87 ° - 90 ° | 11 | 2.4 ± 1 |
| 5 : 1 | 126 ° - 135 ° | 105 ° - 110 ° | 5 | 2.5 ± 1 |
| 8 : 1 | 105 ° - 115 ° | 90 ° - 95 ° | 13 | 2.5 ± 1 |

†AGC Surepco

FIG. 6B

ANTI-MICROBIAL SURFACES AND RELATED METHODS

RELATED APPLICATIONS

This application claims the benefit under 25 U.S.C. 119(e) of U.S. Provisional Application No. 63/075,654, filed Sep. 8, 2020, the disclosure of which is incorporated herein by reference in its entirety.

TECHNICAL FIELD

Anti-microbial compositions, and related articles, methods, and kits, are generally described.

BACKGROUND

Anti-microbial coatings are used to kill or mitigate microbes on surfaces. Metal ions, for example, provide anti-microbial activity by irreversibly binding a variety of cellular components of bacteria, viruses, yeast, fungi, and protozoa, therefore disrupting the normal reproduction and growth cycle, resulting in death of the cell. Many metal compounds, however, are photo- or heat-sensitive, which makes their utilization in commercial products challenging. Furthermore, conventional anti-microbial coatings often lack durability and/or effectiveness.

Accordingly, improved compositions, and related articles, methods, and kits, are necessary.

SUMMARY

Described herein are anti-microbial compositions and related articles, methods, and kits. The subject matter of the present invention involves, in some cases, interrelated products, alternative solutions to a particular problem, and/or a plurality of different uses of one or more systems and/or articles.

According to certain embodiments, an anti-microbial coating is described, the anti-microbial coating comprising a microbial inhibition material. In some embodiments, the microbial inhibition material comprises a silane compound and a metal ion. In certain embodiments, the silane compound comprises a functional group bound to the metal ion.

In some embodiments, a coating is described. According to certain embodiments, the coating comprises a microbial inhibition portion comprising a metal ion, and a fingerprint inhibition portion comprising a silane compound.

According to some embodiments, a method of coating a substrate is described. The method comprises, in some embodiments, activating the substrate, forming a microbial inhibition component on at least a first portion of the substrate, the microbial inhibition component comprising a metal ion, and forming a fingerprint inhibition component on at least a second portion of the substrate.

In certain embodiments, a method is described, the method comprising coating a substrate with a composition comprising a microbial inhibition material. The microbial inhibition material comprises, in some embodiments, a first silane compound and a metal ion, wherein the first silane compound comprises a functional group bound to the metal ion. According to certain embodiments, the coating has a greater than or equal to 99% reduction in retention of a microbe after the coating is exposed to the microbe.

Other advantages and novel features of the present invention will become apparent from the following detailed description of various non-limiting embodiments of the invention when considered in conjunction with the accompanying figures. In cases where the present specification and a document incorporated by reference include conflicting and/or inconsistent disclosure, the present specification shall control.

BRIEF DESCRIPTION OF THE DRAWINGS

Non-limiting embodiments of the present invention will be described by way of example with reference to the accompanying figures, which are schematic and are not intended to be drawn to scale. In the figures, each identical or nearly identical component illustrated is typically represented by a single numeral. For purposes of clarity, not every component is labeled in every figure, nor is every component of each embodiment of the invention shown where illustration is not necessary to allow those of ordinary skill in the art to understand the invention. In the figures:

FIGS. 4A-4B show, according to some embodiments, the microbial inhibition of *Escherichia coli* using anti-microbial compositions formed by reacting a silane compound and ethylenediamine with a copper salt solution at a pH of 2 and 4;

FIGS. 5A-5B show, according to some embodiments, the microbial inhibition of *Escherichia coli* using anti-microbial compositions formed by reacting a silane compound and either tris-ethylenediamine or 6-mercaptopyridine-2,3-dicarboxylic acid with a copper salt solution;

FIGS. 6A-6B show, according to some embodiments, the contact angle and surface energy of a fingerprint inhibition composition comprising an anti-fingerprint component.

DETAILED DESCRIPTION

Figure 1A:
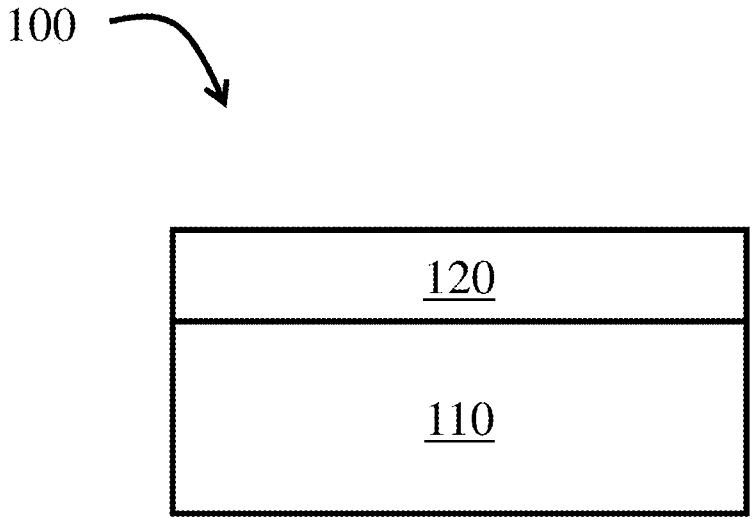
FIG. 1A shows, according to some embodiments, a schematic diagram of an exemplary article comprising a coating.

According to some embodiments, an anti-microbial composition (e.g., an anti-microbial coating), and related methods, are generally described. The anti-microbial composition may be used to kill, inhibit growth, mitigate, and/or inhibit retention of one or more microbes and/or bacteria. The anti-microbial properties of the composition may be provided by a microbial inhibition material, which comprises a silane compound (e.g., a first silane compound) functionalized with a metal ion. The composition may also include a fingerprint inhibition material, which comprises a silane compound (e.g., a second silane compound) that may be preferably hydrophobic. The fingerprint inhibition material may comprise an invisible fingerprint material and/or an anti-fingerprint material. The invisible fingerprint material is configured to hide fingerprints by making them optically less visible (e.g., to the human eye), while the anti-fingerprint material may be configured to suppress the retaining of fingerprints. Without wishing to be bound by theory, the microbial inhibition component provides the coating with anti-microbial properties, while the fingerprint inhibition component provides the coating with chemical durability and improved cosmetic functionality. In addition to providing anti-microbial and anti-fingerprint properties, the composition may also be chemically inert, mechanically robust, and/or optically transparent.

The coatings, articles, and methods described herein may have advantageous properties as compared to traditional coatings and related methods. For example, in some embodiments, the coatings described herein have relatively durable antibacterial invisible fingerprint properties. In some embodiments, the anti-microbial compositions described herein provide anti-microbial properties without the reduction of metal ions (e.g., to form nanoparticles). For example, silver nanoparticles generally use reduction steps to form such nanoparticles.

Advantageously, the coatings described herein may be chemically stable, relatively inexpensive, and may integrate anti-microbial, invisible fingerprint, and/or fingerprint resistant properties, in some embodiments. In some embodiments, the coatings described herein have desirable optical properties. In some embodiments, the coatings described herein may be effective against gram positive and/or gram negative microbes (e.g., while maintaining one or more advantages described herein).

The anti-microbial composition may be formed by depositing (e.g., spray coating, dip coating, chemical vapor deposition) the microbial inhibition component and the fingerprint inhibition component on a substrate. As a result of depositing the components, the first silane compound and the second silane compound chemically bind to the substrate surface (e.g., through —Si—O— linkages). The first silane compound (e.g., of the microbial inhibition material) may be reacted with the metal ion prior to or after depositing the first silane compound on the substrate. Conventional anti-microbial coatings often employ nanoparticles (e.g., silver nanoparticles) that require a strong reducing agent to generate the anti-microbial metal ions (e.g., silver ions). Strong reducing agents are not needed for the anti-microbial coatings described herein, since metal ions are reacted with a functional group on a silane compound that is or is to be deposited on the substrate. The compositions described herein are therefore chemically stable, simple, and less expensive than conventional anti-microbial compositions.

The anti-microbial coating may be used for any of a variety of suitable applications. In some embodiments, for example, the coating may be applied on a substrate such as a glass or plastic, for example, as used in electronic displays, such as, but not limited to, cell phones, computer monitors, television screens, touch screens, appliances, and the like. In certain embodiments, the coating may be applied on a substrate for use in transportation vehicles (e.g., cars, aircrafts) and/or building equipment.

Turning now to the figures, FIG. 1A shows a schematic diagram of an exemplary article, according to some embodiments described herein. In some embodiments, an article 100 comprises a substrate 110 and a coating 120. In some embodiments, coating 120 comprises an anti-microbial composition and/or a fingerprint inhibition composition. As used herein, a fingerprint inhibition composition generally refers to a material that is configured to hide fingerprints by making them optically less visible to the naked human eye (e.g., an invisible fingerprint material) and/or a material that is configured to suppress the retaining of fingerprints (e.g., an anti-fingerprint material). The invisible fingerprint material may be hydrophobic and oleophilic, in some embodiments, while the anti-fingerprint material may be hydrophobic and oleophobic. In some embodiments, the anti-fingerprint material comprises a fluoropolymer. Fingerprint inhibition materials (e.g., invisible fingerprint materials and anti-fingerprint materials) are described in more detail below.

While coating 120 is depicted as a smooth layer of uniform thickness, those of ordinary skill in the art would understand that this is for illustration purposes only and the thickness of the coating may have a particular roughness and/or may vary in thickness, in some embodiments. However, in some embodiments, the coating may be of relatively uniform thickness (e.g., within less than or equal to 10% of the total thickness) over at least a substantial portion (e.g., greater than or equal to 75% of the surface area of the substrate comprising the coating) of the substrate.

In certain embodiments, the anti-microbial composition comprises a microbial inhibition material. The microbial inhibition material may comprise, in some embodiments, a silane compound (e.g., a first silane compound). According to some embodiments, the silane compound of the microbial inhibition material (e.g., the first silane compound) comprises a functional group bound to a metal ion. Examples of metal ions are explained in further detail herein. The functional group comprises, for example, a nitrogen atom, a sulfur atom, a phosphorus atom, or an oxygen atom, in some embodiments. Non-limiting examples of functional groups include, but are not limited to, an amine (e.g., a primary amine, secondary amine, tertiary amine), a diamine (e.g., ethylene diamine, di-ethylene diamine, tri-ethylene diamine), a triamine, an ethanolamine, a thiourea, or a phosphine functional group. Other functional groups that are configured to bind a metal ion are also possible, as would be understood by a person of ordinary skill in the art.

According to some embodiments, the silane compound of the microbial inhibition material (e.g., the first silane compound) comprises the structure of Formula (I):

(I)

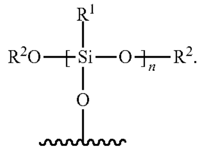

In some embodiments, $R^1$ of Formula (I) is selected from the group consisting of $—C_1\text{-}C_{x+1}$ alkyl-$S(R^3)_y(M)$, $—C_2\text{-}C_{x+2}$ alkenyl-$S(R^3)_y(M)$, $—C_3\text{-}C_{x+3}$ alkynyl-$S(R^3)_y(M)$, $—C_1\text{-}C_x$ alkyl-$N(R^3)_y(M)$, $—C_2\text{-}C_x$ alkenyl-$N(R^3)_y(M)$, $—C_3\text{-}C_x$ alkynyl-$N(R^3)_y(M)$, $—C_1\text{-}C_{x+1}$ alkyl-$P(R^3)_y(M)$, $—C_2\text{-}C_{x+2}$ alkenyl-$P(R^3)_y(M)$, $—C_3\text{-}C_{x+3}$ alkynyl-$P(R^3)_y(M)$, In some embodiments, n is a positive integer. For example, in some embodiments, n is a positive integer and is greater than or equal to 1, greater than or equal to 2, greater than or equal to 10, greater than or equal to 20, greater than or equal to 50, greater than or equal to 100, greater than or equal 200, greater than or equal to 300, greater than or equal to 400, or greater than or equal to 450. In some embodiments, n is a positive integer and is less than or equal to 500, less than or equal to 450, less than or equal to 400, less than or equal to 300, less than or equal to 200, less than or equal to 100, less than or equal to 50, less than or equal to 20, less than or equal to 10, less than or equal to 5, or less than or equal to 2. Combinations of the above referenced ranges are also possible (e.g., greater than or equal to 1 and less than or equal to 500, greater than or equal to 1 and less than or equal to 300). Other ranges are also possible.

In some embodiments, x is a positive integer. For example, in some embodiments, x is a positive integer and is greater than or equal to 1, greater than or equal to 2, greater than or equal to 4, greater than or equal to 6, greater than or equal to 8, greater than or equal to 10, greater than or equal to 12, greater than or equal to 14, greater than or equal to 16, or greater than or equal to 18. In some embodiments, x is a positive integer and is less than or equal to 20, less than or equal to 18, less than or equal to 16, less than or equal to 14, less than or equal to 12, less than or equal to 10, less than or equal to 8, less than or equal to 6, less than or equal to 4, or less than or equal to 2. Combinations of the above referenced ranges are also possible (e.g., less than or equal to 20 and greater than or equal to 1). Other ranges are also possible.

In some embodiments, y is a positive integer. For example, in some embodiments, y is greater than or equal to 1, greater than or equal to 2, or greater than or equal to 3. In some embodiments, y is less than or equal to 4, less than or equal to 3, or less than or equal to 2. Combinations of the above referenced ranges are also possible (e.g., less than or equal to 4 and greater than or equal to 1). Other ranges are also possible.

In some embodiments, M is a metal ion. As used herein, the term "metal ion" is given its ordinary meaning in the art and generally refers to a metal atom that has an electric (e.g. cationic) charge. In certain embodiments, the metal ion is a silver ion (e.g., $Ag^+$). The metal ion may be a copper ion (e.g., $Cu^+$, $Cu^{2+}$), in some embodiments. Other metal ions with anti-microbial properties may also be employed, in some embodiments, such as, but not limited to, titanium (e.g., $Ti^{3+}$, $Ti^{4+}$), vanadium (e.g., $V^{2+}$, $V^{3+}$) chromium (e.g., $Cr^{2+}$, $Cr^{3+}$), manganese (e.g., $Mn^{2+}$, $Mn^{4+}$), iron (e.g., $Fe^{2+}$, $Fe^{3+}$), cobalt (e.g., $Co^{2+}$, $Co^{3+}$), nickel (e.g., $Ni^{2+}$), zinc (e.g., $Zn^{2+}$), zirconium (e.g., $Zr^{2+}$), palladium (e.g., $Pd^{2+}$), cadmium (e.g., $Cd^{2+}$), platinum (e.g., $Pt^{2+}$, $Pt^{4+}$), gold (e.g., $Au^+$, $Au^{3+}$), mercury (e.g., $Hg^{2+}$), terbium (e.g., $Tb^{3+}$), tungsten (e.g., $W^{4+}$), aluminum (e.g., $Al^{3+}$), gallium (e.g., $Ga^{3+}$), germanium (e.g., $Ge^{2+}$), arsenic (e.g., $As^{3+}$), selenium (e.g., $Se^{2+}$) tin (e.g., $Sn^{2+}$), antimony (e.g., $Sb^{3+}$), tellurium (e.g., $Te^{2+}$), lead (e.g., $Pb^{4+}$), bismuth (e.g., $Bi^{3+}$), and/or combinations thereof. Other metal ions are also possible. While the embodiments described herein generally refer to metal ions, the disclosure is not meant to be limited in this regard, and metals are also possible, as would be understood by a person of ordinary skill in the art based upon the teachings of this specification. For example, M may be a metal and may be selected from the group consisting of Ag, Cu, Ti, V, Cr, Mn, Fe, Co, Ni, Zn, Zr, Pd, Cd, Pt, Au, Hg, W, Al, Ga, Ge, Tb, As, Se, Sn, Sb, Te, Pb, and Bi. Other metals and/or metal ions may also be possible. Suitable metal sources salts (e.g., metal salts, metal nanoparticles) that are used to provide the metal ion are described herein in greater detail below.

In some embodiments, each $R^2$ of Formula (I) is the same or different and is a bond to another Si atom of a repeating structure, or is selected from the group consisting of hydrogen, $—C_1$-$C_{10}$ alkyl, $—C_2$-$C_{10}$ alkenyl, $—C_3$-$C_{10}$ alkynyl.

In some embodiments, each carbon atom and/or hydrogen atom in $R^1$ and $R^2$ is independently optionally substituted with deuterium, halogen, —OH, —CN, $—OR^3$, $—CO_2H$, $—C(O)OR^3$, $—C(O)NH_2$, $C(O)NH(C_1$-$C_{10}$ alkyl), —C(O)$N(C_1$-$C_{10}$ alkyl$)_2$, $SC_1$-$C_{10}$ alkyl, $—S(O)C_1$-$C_{10}$ alkyl, $—S(O)_2C_1$-$C_{10}$ alkyl, $—S(O)NH(C_1$-$C_{10}$ alkyl), $—S(O)_2NH(C_1$-$C_{10}$ alkyl), $—S(O)N(C_1C_{10}$ alkyl$)_2$, $—S(O)_2N(C_1$-$C_{10}$ alkyl$)_2$, $—NR^3$, $—NH_2$, $—C_2H_8N_2$, $—NH(C_1$-$C_{10}$ alkyl), $—P(C_1$-$C_{10}$ alkyl$)_2$, $—P(O)(C_1$-$C_{10}$ alkyl$)_2$, $—PO_3H_2$, or $—Si(—OC_1$-$C_{10}$ alkyl$)_3$, In some embodiments, each $R^3$ is selected from the group consisting of a bond, hydrogen, deuterium, $—C_1$-$C_{10}$ alkyl, $—C_2$-$C_{10}$ alkenyl, $—C_2$-$C_{10}$ alkynyl, $—C_3$-$C_{10}$ cycloalkyl, and $—C_1$-$C_{10}$ alkyl-O$—C_1$-$C_{10}$ alkyl, optionally substituted and n is a positive integer.

In certain embodiments, the silane compound of the microbial inhibition material (e.g., the first silane) is immobilized on a substrate. The silane compound may, in some embodiments, be chemically bound to the substrate. In some embodiments, for example, the silane compound is bound to the substrate by covalent bonds and/or non-covalent bonds. Examples of bonding interactions include, in some embodiments, ionic bonds, van der Waals forces, hydrogen bonding, dipole interactions, coordination, chelation, and the like. According to some embodiments, for example, the silane compound of the microbial inhibition material may be immobilized on the substrate through —Si—O— linkages, wherein the oxygen atom is bound to the substrate (e.g., as depicted in Formula (I)). Exemplary substrates are explained in further detail herein.

The anti-microbial composition may comprise the microbial inhibition material in any of a variety of suitable amounts. According to certain embodiments, the anti-microbial composition comprises the microbial inhibition material in an amount greater than or equal to 0.1 wt. %, greater than or equal to 1 wt. %, greater than or equal to 5 wt. %, greater than or equal to 10 wt. %, greater than or equal to 20 wt. %, greater than or equal to 30 wt. %, greater than or equal to 40 wt. %, greater than or equal to 50 wt. %, greater than or equal to 60 wt. %, greater than or equal to 70 wt. %, greater than or equal to 80 wt. %, greater than or equal to 90 wt. %, or more, based on the total weight of the anti-microbial composition. In certain embodiments, the anti-microbial composition comprises the microbial inhibition material in an amount 100 wt. %, less than or equal to 90 wt. %, less than or equal to 80 wt. %, less than or equal to 70 wt. %, less than or equal to 60 wt. %, less than or equal to 50 wt. %, less than or equal to 40 wt. %, less than or equal to 30 wt. %, less than or equal to 20 wt. %, less than or equal to 10 wt. %, less than or equal to 5 wt. %, less than or equal to 1 wt. %, or less, based on the total weight of the anti-microbial composition. Combinations of the above recited ranges are also possible (e.g., the anti-microbial composition comprises the microbial inhibition material in an amount greater than or equal to 0.1 wt. % and less than or equal to 100 wt. % based on the total weight of the anti-microbial composition, the anti-microbial composition comprises the microbial inhibition material in an amount greater than or equal to 0.1 wt. % and less than or equal to 1 wt. % based on the total weight of the anti-microbial composition). Other ranges are also possible.

In certain embodiments, the anti-microbial composition comprises a fingerprint inhibition material. The fingerprint inhibition material may comprise, in some embodiments, a silane compound (e.g., a second silane compound). The silane compound of the fingerprint inhibition material (e.g., the second silane compound) may provide hydrophobic properties, in some embodiments. In some embodiments, the fingerprint inhibition material may comprise an invisible fingerprint material that is hydrophobic and oleophilic and/or an anti-fingerprint material that is hydrophobic and oleophobic.

According to some embodiments, the silane compound of the fingerprint inhibition material (e.g., the second silane compound) comprises the structure of Formula (II):

(II)

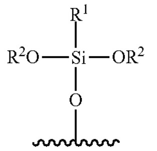

In some embodiments, $R^1$ of Formula (II) is selected from the group consisting of —$C_1$-$C_{20}$ alkyl, —$C_2$-$C_{20}$ alkenyl, and —$C_3$-$C_{20}$ alkynyl, any of which may be optionally at least partially halogenated (e.g., fluorinated).

In some embodiments, the fingerprint inhibition material comprises an invisible fingerprint material. Without wishing to be bound by theory, the invisible fingerprint material may, in some embodiments, have a relatively high surface energy that advantageously provides the material with the ability to hide fingerprints. In some embodiments, the fingerprint inhibition material comprises an anti-fingerprint material wherein $R^1$ of Formula (II) is least partially halogenated (e.g., fluorinated). Without wishing to be bound by theory, in some embodiments, the at least partially halogenated compound advantageously renders the fingerprint inhibition material oleophobic and/or provides enhanced anti-fingerprint properties due to the low surface energy of the halogenated (e.g., fluorinated) material. In some non-limiting embodiments, for example, the anti-fingerprint material comprises a (per)fluoropolyether silane.

In some embodiments, each $R^2$ of Formula (II) is the same or different and is a linkage to a substrate, or is selected from the group consisting of hydrogen, —$C_1$-$C_{10}$ alkyl, —$C_2$-$C_{10}$ alkenyl, and —$C_3$-$C_{10}$ alkynyl.

In some embodiments, each carbon atom and/or hydrogen atom in $R^1$ and $R^2$ is independently optionally substituted with deuterium, halogen, —OH, —CN, —$OR^3$, —$CO_2H$, —$C(O)OR^3$, —$C(O)NH_2$, $C(O)NH(C_1$-$C_{10}$ alkyl), —C(O) $N(C_1$-$C_{10}$ alkyl$)_2$, $SC_1$-$C_{10}$ alkyl, —$S(O)C_1$-$C_{10}$ alkyl, —$S(O)_2C_1$-$C_{10}$ alkyl, —$S(O)NH(C_1$-$C_{10}$ alkyl), —$S(O)_2NH(C_1$-$C_{10}$ alkyl), —$S(O)N(C_1C_{10}$ alkyl$)_2$, —$S(O)_2N(C_1$-$C_{10}$ alkyl$)_2$, —$NR^3$, —$NH_2$, —$C_2H_8N_2$, —$NH(C_1$-$C_{10}$ alkyl), —$P(C_1$-$C_{10}$ alkyl$)_2$, —$P(O)(C_1$-$C_{10}$ alkyl$)_2$, —$PO_3H_2$, or —Si(—$OC_1$-$C_{10}$ alkyl$)_3$; and In some embodiments, each $R^3$ is selected from the group consisting of hydrogen, deuterium, —$C_1$-$C_{10}$ alkyl, —$C_2$-$C_{10}$ alkenyl, —$C_2$-$C_{10}$ alkynyl, —$C_3$-$C_{10}$ cycloalkyl, and —$C_1$-$C_{10}$ alkyl-O—$C_1$-$C_{10}$ alkyl, optionally substituted.

Further examples of the fingerprint inhibition material are described in U.S.

Patent Publication No. 2019/0367773, published on Dec. 5, 2019, filed on May 24, 2019, entitled "Invisible fingerprint coatings and process for forming same", which is incorporated herein by reference in its entirety.

In some embodiments, the silane compound of the fingerprint inhibition material (e.g., the second silane compound) is immobilized on a substrate. According to certain embodiments, the silane compound of the fingerprint inhibition material (e.g., the second silane compound) is immobilized on the substrate through —Si—O— linkages, wherein the oxygen atom is bound to the substrate (e.g., as depicted in Formula (II)).

The anti-microbial composition may comprise the fingerprint inhibition material in any of a variety of suitable amounts. According to certain embodiments, the anti-microbial composition comprises the fingerprint inhibition material in an amount greater than or equal to 0.1 wt. %, greater than or equal to 1 wt. %, greater than or equal to 5 wt. %, greater than or equal to 10 wt. %, greater than or equal to 20 wt. %, greater than or equal to 30 wt. %, greater than or equal to 40 wt. %, greater than or equal to 50 wt. %, greater than or equal to 60 wt. %, greater than or equal to 70 wt. %, greater than or equal to 80 wt. %, greater than or equal to 90 wt. %, or more, based on the total weight of the anti-microbial composition. In certain embodiments, the anti-microbial composition comprises the fingerprint inhibition material in an amount less than or equal to 100 wt. %, less than or equal to 90 wt. %, less than or equal to 80 wt. %, less than or equal to 70 wt. %, less than or equal to 60 wt. %, less than or equal to 50 wt. %, less than or equal to 40 wt. %, less than or equal to 30 wt. %, less than or equal to 20 wt. %, less than or equal to 10 wt. %, less than or equal to 5 wt. %, less than or equal to 1 wt. %, or less, based on the total weight of the anti-microbial composition. Combinations of the above recited ranges are also possible (e.g., the anti-microbial composition comprises the fingerprint inhibition material in an amount greater than or equal to 0.1 wt. % and less than or equal to 100 wt. % based on the total weight of the anti-microbial composition, the anti-microbial composition comprises the fingerprint inhibition material in an amount greater than or equal to 0.1 wt. % and less than or equal to 1 wt. % based on the total weight of the anti-microbial composition). Other ranges are also possible.

According to certain embodiments, the anti-microbial composition comprises the microbial inhibition material and the fingerprint inhibition material in any of a variety of suitable ratios. In some embodiments, for example, the anti-microbial composition (e.g., a coating comprising the anti-microbial composition) comprises the microbial inhibition material and the fingerprint inhibition material in a ratio less than or equal to 20:1, less than or equal to 15:1, less than or equal to 10:1, less than or equal to 9:1, less than or equal to 8:1, less than or equal to 7:1, less than or equal to 6:1, less than or equal to 5:1, less than or equal to 4:1, less than or equal to 3:1, less than or equal to 2:1, less than or equal to 1:1, less than or equal to 1:2, less than or equal to 1:3, less than or equal to 1:4, less than or equal to 1:5, less than or equal to 1:6, less than or equal to 1:7, less than or equal to 1:8, or less than or equal to 1:9. In certain embodiments, the anti-microbial composition comprises the microbial inhibition material and the fingerprint inhibition material in a ratio greater than or equal to 1:20, greater than or equal to 1:15, greater than or equal to 1:10, greater than or equal to 1:9, greater than or equal to 1:8, greater than or equal to 1:7, greater than or equal to 1:6, greater than or equal to 1:5, greater than or equal to 1:4, greater than or equal to 1:3, greater than or equal to 1:2, greater than or equal to 1:1, greater than or equal to 2:1, greater than or equal to 3:1, greater than or equal to 4:1, greater than or equal to 5:1, greater than or equal to 6:1, greater than or equal to 7:1, greater than or equal to 8:1, greater than or equal to 9:1, or more. Combinations of the above recited ranges are also possible (e.g., the anti-microbial composition comprises the microbial inhibition material and the fingerprint inhibition material in a ratio of greater than or equal to 1:20 and less than or equal to 20:1, the anti-microbial composition comprises the microbial inhibition material and the fingerprint inhibition material in a ratio of greater than or equal to 3:1 and less than or equal to 5:1, greater than or equal to 1:10 and less than or equal to 1:1, the anti-microbial composition comprises the microbial inhibition material and the fingerprint inhibition material in a ratio of greater than or equal to 1:3 and less than or equal to 1:5). Other ranges are also possible.

In certain embodiments, the anti-microbial composition causes a reduction in retention of a microbe after the anti-microbial material is exposed to the microbe. Without wishing to be bound by theory, the reduction in retention of a microbe is caused by the microbial inhibition material, as would be understood by a person of ordinary skill in the art. In certain embodiments, for example, the anti-microbial composition causes a greater than or equal to 90%, greater than or equal to 95%, greater than or equal to 99%, greater than or equal to 99.5%, greater than or equal to 99.9%, or greater than or equal to 99.99% reduction in retention of a microbe after the anti-microbial composition is exposed to the microbe. In some embodiments, the anti-microbial composition causes a less than or equal to 100%, less than or equal to 99.99%, less than or equal to 99.9%, less than or equal to 99.5%, less than or equal to 99%, or less than or equal to 95% reduction in retention of a microbe after the anti-microbial composition is exposed to the microbe. Combinations of the above recited ranges are also possible (e.g., the anti-microbial composition causes a greater than or equal to 90% and less than or equal to 100% reduction in retention of a microbe after the anti-microbial composition is exposed to the microbe, the anti-microbial composition causes a greater than or equal to 99% and less than or equal to 99.9% reduction in retention of a microbe after the anti-microbial composition is exposed to the microbe). Other ranges are also possible.

The anti-microbial material may cause a reduction in retention of any of a variety of suitable microbes and/or bacteria. The microbe and/or bacterium may be a gram-positive and/or gram-negative microbe. In some embodiments, for example, the microbe and/or bacterium is of the genus *Escherichia, Staphylococcus, Streptococcus, Listeria, Enterococcus, Salmonella*, and/or *Pseudomonas*. For example, in some embodiments, the microbe and/or bacterium is or comprises *Escherichia coli* (*E. coli*) and/or *Staphylococcus aureus* (*S. aureus*). Other microbes and/or bacteria are also possible.

The anti-microbial material may have any of a variety of water contact angles. In some embodiments, for example, the anti-microbial material has a water contact angle of greater than or equal to 60, greater than or equal to 65, greater than or equal to 70, greater than or equal to 75, greater than or equal to 80, greater than or equal to 85, greater than or equal to 90, greater than or equal to 95, or more. In certain embodiments, the anti-microbial material has a water contact angle of less than or equal to 100, less than or equal to 95, less than or equal to 90, less than or equal to 85, less than or equal to 80, less than or equal to 75, less than or equal to 70, less than or equal to 65, or less. Combinations of the above recited ranges are also possible (e.g., the anti-microbial material has a water contact angle of greater than or equal to 60 and less than or equal to 100, the anti-microbial material has a water contact angle of greater than or equal to 75 and less than equal to 85). Other ranges are also possible.

The anti-microbial material may have any of a variety of diiodomethane contact angles. In some embodiments, for example, the anti-microbial material has a diiodomethane contact angle of greater than or equal to 20, greater than or equal to 25, greater than or equal to 30, greater than or equal to 35, greater than or equal to 40, greater than or equal to 45, greater than or equal to 50, greater than or equal to 55, or more. In certain embodiments, the anti-microbial material has a diiodomethane contact angle of less than or equal to 60, less than or equal to 55, less than or equal to 50, less than or equal to 45, less than or equal to 40, less than or equal to 35, less than or equal to 30, less than or equal to 25, or less. Combinations of the above recited ranges are also possible (e.g., the anti-microbial material has a diiodomethane contact angle of greater than or equal to 20 and less than or equal to 60, the anti-microbial material has a diiodomethane contact angle of greater than or equal to 35 and less than equal to 45). Other ranges are also possible. Contact angle, as described herein, may be determined using a contact goniometer.

Conventional optically transparent substrates and coatings are subject to mechanical abrasion, which degrades, wears away, or diminishes the coating thickness, transparency, or effectiveness of the coating overtime. Abrasion occurs during substrate handling by the user, such as by rubbing with a cloth to remove fingerprints and dirt, which is periodically necessary for restoring satisfactory visibility through a transparent substrate. Degradation may also result from exposure to ultraviolet radiation, heat, cold, chemical, salt or other corrosive material, dirt, other abrasive material, or other environmental elements, conditions, or materials.

In some embodiments, the anti-microbial material (e.g., anti-microbial coating) has a particular abrasion resistance as measured by the water angle after a certain number of abrasions. In certain embodiments, the abrasion method is based off of ASTM D1044-99 using a CS-10 eraser abradant with 1 kg force. According to some embodiments, for example, the anti-microbial material may have a particular water contact angle after enduring greater than or equal to 1,000 abrasion cycles, greater than or equal to 1,500 abrasion cycles, greater than or equal to 3,000 abrasion cycles, greater than or equal to 4,500 abrasion cycles, greater than or equal to 6,000 abrasion cycles, greater than or equal to 7,500 abrasion cycles, greater than or equal to 9,000 abrasion cycles, greater than or equal to 10,000 abrasion cycles, or more. The water contact angle of the anti-microbial material, for example, may be greater than or equal to 40°, greater than or equal to 45°, greater than or equal to 50°, greater than or equal to 55°, greater than or equal to 60°, greater than or equal to 65°, greater than or equal to 70°, greater than or equal to 75°, or more after enduring greater than or equal to 1,000 abrasion cycles, greater than or equal to 1,500 abrasion cycles, greater than or equal to 3,000 abrasion cycles, greater than or equal to 4,500 cycles, greater than or equal to 7,500 abrasion cycles, greater than or equal to 9,000 abrasion cycles, greater than or equal to 10,000 abrasion cycles, or more. In certain embodiments, the water contact angle is less than or equal to 80°, less than or equal to 75°, less than or equal to 70°, less than or equal to 65°, less than or equal to 60°, less than or equal to 55°, less than or equal to 50°, less than or equal to 45°, or less, after enduring greater than or equal to 1,000 abrasion cycles, greater than or equal to 1,500 abrasion cycles, greater than or equal to 3,000 abrasion cycles, greater than or equal to 4,500 abrasion cycles, greater than or equal to 7,500 abrasion cycles, greater than or equal to 9,000 abrasion cycles, greater than or equal to 10,000 abrasion cycles, or more. Combinations of the above recited ranges are also possible (e.g., the anti-microbial material has a water contact angle of greater than or equal to 40° and less than or equal to 80° after enduring greater than or equal to 1,000 abrasion cycles, greater than or equal to 1,500 abrasion cycles, greater than or equal to 3,000 abrasion cycles, greater than or equal to 4,500 abrasion cycles, greater than or equal to 7,500 abrasion cycles, greater than or equal to 9,000 abrasion cycles, greater than or equal to 10,000 abrasion cycles, or more, the anti-microbial material has a water contact angle of greater than or equal to 55° and less than or equal to 65° after enduring greater than or equal to 1,000 abrasion cycles, greater than or equal to 1,500 abrasion cycles, greater than or equal to 3,000 abrasion cycles, greater than or equal to 4,500 abrasion cycles, greater than or equal to 7,500 abrasion cycles, greater than or equal to 9,000 abrasion cycles, greater than or equal to 10,000 abrasion cycles, or more). Other ranges are also possible.

In certain non-limiting embodiments, the anti-microbial material has a water contact angle of greater than or equal to 45° and less than or equal to 65° after enduring between greater than or equal to 1,500 abrasion cycles and less than or equal to 4,500

In some embodiments, the anti-microbial material (e.g., anti-microbial coating) has a particular abrasion resistance as measured by the diiodomethane contact angle after a certain number of abrasions. In certain embodiments, the abrasion method is based off of ASTM D1044-99 using a CS-10 eraser abradant with 1 kg force. According to some embodiments, for example, the anti-microbial material may have a particular diiodomethane contact angle after enduring greater than or equal to 1,000 abrasion cycles, greater than or equal to 1,500 abrasion cycles, greater than or equal to 3,000 abrasion cycles, greater than or equal to 4,500 abrasion cycles, greater than or equal to 6,000 abrasion cycles, greater than or equal to 7,500 abrasion cycles, greater than or equal to 9,000 abrasion cycles, greater than or equal to 10,000 abrasion cycles, or more. The diiodomethane contact angle of the anti-microbial material, for example, may be greater than or equal to 30°, greater than or equal to 35°, greater than or equal to 40°, greater than or equal to 45°, greater than or equal to 50°, greater than or equal to 55°, greater than or equal to 60°, greater than or equal to 65°, greater than or equal to 70°, greater than or equal to 75°, or more after enduring greater than or equal to 1,000 abrasion cycles, greater than or equal to 1,500 abrasion cycles, greater than or equal to 3,000 abrasion cycles, greater than or equal to 4,500 cycles, greater than or equal to 6,000 abrasion cycles, greater than or equal to 7,500 abrasion cycles, greater than or equal to 9,000 abrasion cycles, greater than or equal to 10,000 abrasion cycles, or more. In certain embodiments, the diiodomethane contact angle is less than or equal to 80°, less than or equal to 75°, less than or equal to 70°, less than or equal to 65°, less than or equal to 60°, less than or equal to 55°, less than or equal to 50°, less than or equal to 45°, less than or equal to 40°, less than or equal to 35°, or less, after enduring greater than or equal to 1,000 abrasion cycles, greater than or equal to 1,500 abrasion cycles, greater than or equal to 3,000 abrasion cycles, greater than or equal to 4,500 cycles, greater than or equal to 6,000 abrasion cycles, greater than or equal to 7,500 abrasion cycles, greater than or equal to 9,000 abrasion cycles, greater than or equal to 10,000 abrasion cycles, or more. Combinations of the above recited ranges are also possible (e.g., the anti-microbial material has a diiodomethane contact angle of greater than or equal to 40° and less than or equal to 80° after enduring greater than or equal to 1,000 abrasion cycles, greater than or equal to 1,500 abrasion cycles, greater than or equal to 3,000 abrasion cycles, greater than or equal to 4,500 cycles, greater than or equal to 6,000 abrasion cycles, greater than or equal to 7,500 abrasion cycles, greater than or equal to 9,000 abrasion cycles, greater than or equal to 10,000 abrasion cycles, or more, the anti-microbial material has a diiodomethane contact angle of greater than or equal to 55° and less than or equal to 65° after enduring greater than or equal to 1,000 abrasion cycles, greater than or equal to 1,500 abrasion cycles, greater than or equal to 3,000 abrasions, greater than or equal to 4,500 cycles, greater than or equal to 6,000 abrasion cycles, greater than or equal to 7,500 abrasion cycles, greater than or equal to 9,000 abrasion cycles, greater than or equal to 10,000 abrasion cycles, or more). Other ranges are also possible.

In certain non-limiting embodiments, the anti-microbial material has a diiodomethane contact angle of greater than or equal to 35° and less than or equal to 45° after enduring between greater than or equal to 1,500 abrasion cycles and less than or equal to 4,500 abrasion cycles.

A method of coating a substrate is described, according to some embodiments. According to certain embodiments, the substrate comprises a glass, a ceramic, a metal, a metal oxide, a polymer (e.g., an acrylic polymer, a plastic), an electronic component (e.g., a silicon wafer), and/or combinations thereof. Further exemplary substrates are explained herein.

Figure 1B:
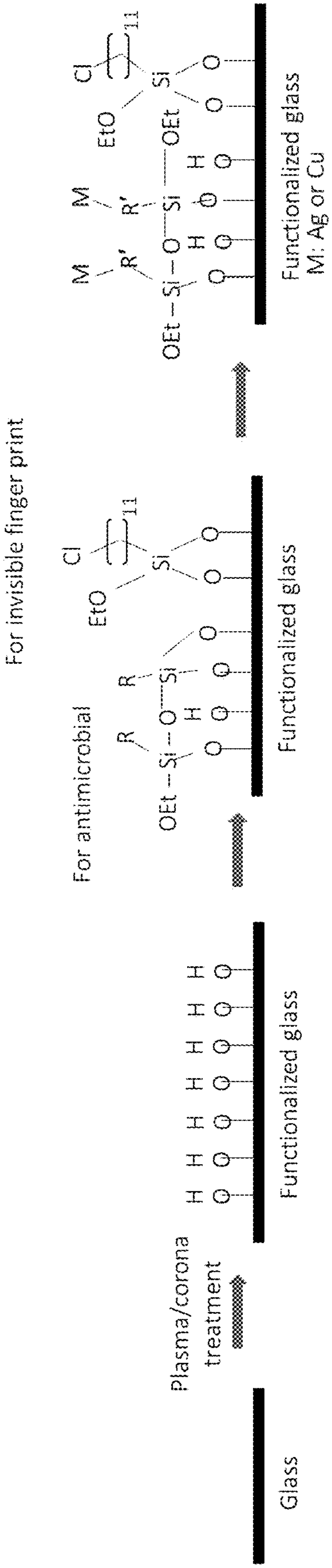
FIG. 1B shows, according to some embodiments, a schematic diagram of an exemplary method for forming a coating on a substrate.

FIG. 1B shows an illustrative example of a method for coating a substrate, according to some embodiments.

In certain embodiments, the method comprises activating at least a portion of a substrate (e.g., a glass substrate). According to certain embodiments, the substrate is activated by exposing the substrate to a plasma of inert gas, such as, but not limited to, Ar, Ne, He, $N_2$, $O_2$, $H_2O$, and/or mixtures thereof. In some embodiments, the substrate is activated by mechanically treating the surface with a metal oxide or acid etching (e.g., with hydrofluoric acid or hydrochloric acid). Without wishing to be bound by theory, as a result of activating at the substrate, the density of hydroxyl (—OH) moieties on the surface of the substrate is increased, thereby facilitating immobilization (e.g., bonding) of the first silane compound and/or the second silane compound, as is explained in greater detail herein.

In some embodiments, the method comprises forming a microbial inhibition component on at least a first portion of the substrate (e.g., the activated substrate). Forming the microbial inhibition component comprises, in some embodiments, depositing a first silane precursor compound on at least a first portion of the substrate. Any of a variety of deposition techniques may be utilized to deposit the first silane precursor compound on at least a first portion of the substrate. In some embodiments, for example, depositing the first silane may comprise spinning (e.g., spin coating), spraying (e.g., spray coating), dipping (e.g., dip coating), wiping, chemical vapor deposition (CVD), or physical vapor deposition (PVD). In certain embodiments, for example, the first silane may be sprayed onto the at least first portion of the substrate. In another embodiment, the substrate may be dipped into a solution containing the first silane. In yet another embodiment, the first silane may be deposited onto the substrate using physical vapor deposition.

The first silane precursor compound may comprise, in certain embodiments, a thiol, an amine (e.g., a primary amine, secondary amine, or tertiary amine), a diamine (e.g., ethylene diamine, di-ethylene diamine, tri-ethylene diamine), a triamine, an ethanolamine, a thiourea, or a phosphine functional group. In some embodiments, the functional group comprises a hydroxyl group, a carboxylate group, an ester group, or a carbonyl group. Other functional groups are possible. In some embodiments, for example, the functional group may comprise a pyridine derivative (e.g., bipyridine). Further exemplary functional groups are described herein. In some embodiments, the functional group (e.g., the amine) is configured to bind the metal ion and/or donate electrons to the metal ion.

In certain embodiments, the first silane precursor compound comprises the structure $(R^2O)_3SiR^1$.

In some embodiments, $R^1$ of the first silane precursor compound is selected from the group consisting of $—C_1$-$C_{x+1}$ alkyl-$S(R^3)_y$, $—C_2$-$C_{x+2}$ alkenyl-$S(R^3)_y$, $—C_3$-$C_{x+3}$ alkynyl-$S(R^3)_y$, $—C_1$-$C_x$ alkyl-$N(R^3)_y$, $—C_2$-$C_x$ alkenyl-N$(R^3)_y$, $—C_3$-$C_x$ alkynyl-$N(R^3)_y$, $—C_1$-$C_{x+1}$ alkyl-$P(R^3)_y$, $—C_2$-$C_{x+2}$ alkenyl-$P(R^3)_y$, $—C_3$-$C_{x+3}$ alkynyl-$P(R^3)_y$, wherein x is greater than or equal to 1 and less than or equal to 20 and y is greater than or equal to 1 and less than or equal to 3.

In some embodiments, each $R^2$ of the first silane precursor compound is the same or different and is selected from the group consisting of hydrogen, $—C_1$-$C_{10}$ alkyl, $—C_2$-$C_{10}$ alkenyl, and $—C_3$-$C_{10}$ alkynyl, In some embodiments, each carbon atom and/or hydrogen atom in $R^1$ and $R^2$ is independently optionally substituted with deuterium, halogen, —OH, —CN, $—OR^3$, $—CO_2H$, $—C(O)OR^3$, $—C(O)NH_2$, C(O)NH($C_1$-$C_{10}$ alkyl), —C(O)N($C_1$-$C_{10}$ alkyl$)_2$, $SC_1$-$C_{10}$ alkyl, $—S(O)C_1$-$C_{10}$ alkyl, $—S(O)_2C_1$-$C_{10}$ alkyl, —S(O)NH($C_1$-$C_{10}$ alkyl), $—S(O)_2NH(C_1$-$C_{10}$ alkyl), $—S(O)N(C_1C_{10}$ alkyl$)_2$, $—S(O)_2N(C_1$-$C_{10}$ alkyl$)_2$, $—NR^3$, $—NH_2$, $—C_2H_8N_2$, $—NH(C_1$-$C_{10}$ alkyl), $—P(C_1$-$C_{10}$ alkyl$)_2$, $—P(O)(C_1$-$C_{10}$ alkyl$)_2$, $—PO_3H_2$, or $—Si(—OC_1$-$C_{10}$ alkyl$)_3$; and In some embodiments, each $R^3$ is selected from the group consisting of hydrogen, deuterium, $—C_1$-$C_{10}$ alkyl, $—C_2$-$C_{10}$ alkenyl, $—C_2$-$C_{10}$ alkynyl, $—C_3$-$C_{10}$ cycloalkyl, and $—C_1$-$C_{10}$ alkyl-O—$C_1$-$C_{10}$ alkyl, optionally substituted.

Any of a variety of suitable first silane precursor compounds may be utilized. In certain embodiments, for example, the first silane precursor compound is selected from the group consisting of 11-mercaptoundecyl triethoxysilane and 11-(2-aminoethyl)aminoundecyl triethoxysilane.

According to certain embodiments, depositing a first silane precursor compound on at least a first portion of the substrate provides a first silane compound immobilized on the substrate (e.g., through —Si—O— linkages, as explained herein).

In some embodiments, forming the microbial inhibition component comprises reacting the first silane compound that is immobilized on the substrate with a metal ion (e.g., a silver ion, a copper ion), thereby providing a compound of Formula (I). According to certain embodiments, reacting the first silane compound that is immobilized on the substrate with the metal ion may comprise depositing the metal ion with and/or on the first silane compound that is immobilized on the substrate. In some embodiments, for example, depositing the metal ion may comprise spinning (e.g., spin coating), spraying (e.g., spray coating), dipping (e.g., dip coating), wiping, chemical vapor deposition (CVD), or physical vapor deposition (PVD). In certain embodiments, for example, the metal ion may be sprayed onto the first silane compound immobilized on the substrate. In another embodiment, the first silane compound immobilized on the substrate may be dipped into a solution containing the metal ion. In yet another embodiment, the metal ion may be deposited onto the first silane compound immobilized on the substrate using physical vapor deposition.

In some embodiments, the first silane precursor compound may be reacted with the metal ion prior to depositing the first silane precursor compound on at least a first portion of the substrate. In some such embodiments, for example, the first silane precursor compound (e.g., of the formula $(R^2O)_3SiR^1$) may be reacted with a metal ion (e.g., a silver ion, a copper ion), thereby providing a metal-activated first silane precursor compound. The metal ion-containing first silane precursor compound may then be deposited on at least a portion of the substrate, in some embodiments, thereby providing a compound of Formula (I). The metal ion-containing first silane precursor compound may be deposited using any of the methods described herein, for example, spraying, dipping, and/or physical deposition.

In some embodiments, the metal ion is provided as a metal salt. In some embodiments, for example, the microbial inhibition component is formed by reacting the first silane compound (e.g., immobilized on the substrate) with a metal salt to provide the compound of Formula (I).

Any of a variety of suitable metal salts may be utilized. In some embodiments, for example, the metal ion may be a copper ion (e.g., $Cu^+$, $Cu^{2+}$) that is provided as a copper salt. The $Cu^+$ may be provided, in some embodiments, as copper (I) sulfide ($Cu_2S$); thiophenol copper(I) ($C_6H_5SCu$); copper (I) thiocyanate (CuSCN); copper(I) cyanamide (CuCN); copper(I) chloride (CuCl); copper(I) bromide (CuBr); copper(I) oxide ($Cu_2O$); copper(I) selenide ($Cu_2Se$); copper(I) acetate ($Cu(CH_3COO)$)); copper(I) trifluoromethanesulfonate benzene complex ($(CF_3SO_3Cu)_2 \cdot C_6H_6$); tetrakisacetonitrile copper(I) triflate ($Cu(NCCH_3)_4 \cdot CF_3SO_3$); or bis[(tetrabutylammonium iodide)copper(I) iodide] ($C_{32}H_{72}Cu_2I_4N_2$). In certain embodiments, the $Cu^{2+}$ ion may be provided as copper(II) oxide (CuO); copper(II) hydroxide ($Cu(OH)_2$); copper(II) sulfide (CuS) copper(II) nitrate ($Cu(NO_3)_2$; copper(II) fluoride ($CuF_2$); copper(II) chloride ($CuCl_2$); copper(II) bromide ($CuBr_2$); copper(II) trifluoroacetylacetonate ($Cu(C_5H_4F_3O_2)_2$); copper(II) sulfate ($CuSO_4$); copper(II) sulfate pentahydrate ($CuSO_4 \cdot 5H_2O$); copper(II) trifluoromethanesulfonate ($(CF_3SO_3)_2Cu$); copper(II) acetylacetonate ($Cu(C_5H_7O_2)_2$); copper(II) ethylacetoacetate ($C_{12}H_{18}CuO_6$); bis(t-butylacetoacetato)copper(II) ($C_{16}H_{26}CuO_6$); copper(II) 2-pyrazinecarboxylate ($C_{10}H_6CuN_4O_4$); copper(II) phthalocyanine ($C_{32}H_{16}CuN_8$); copper(II) acetate ($Cu(CO_2CH_3)_2$); or copper(II) perchlorate ($Cu(ClO_4)_2$). Other copper salts are also possible. Although copper salts are described herein, other metal salts (e.g., silver salts, titanium salts, vanadium salts, chromium salts, manganese salts, etc.) are also possible, as the disclosure is not meant to be limiting in this regard.

The metal salt may be provided in any of a variety of suitable concentrations. In some embodiments, for example, the metal salt is provided (e.g., as a solution) with a concentration greater than or equal to 0.001 M, greater than or equal to 0.005 M, greater than or equal to 0.01 M, greater than or equal to 0.05 M, greater than or equal to 0.1 M, greater than or equal to 0.5 M, greater than or equal to 1 M, or more. In certain embodiments, the metal salt is provided (e.g., as a solution) with a concentration less than or equal to 1 M, less than or equal to 0.5 M, less than or equal to 0.1 M, less than or equal to 0.05 M, less than or equal to 0.01 M, less than or equal to 0.005 M, less than or equal to 0.001 M, or less. Combinations of the above recited ranges are also possible (e.g., the metal salt is provided with a concentration greater than or equal to 0.001 M and less than or equal to 1 M, the metal salt is provided with a concentration greater than or equal to 0.01 M and less than or equal to 0.1 M). Other combinations of the above referenced ranges are also possible.

In some embodiments, the metal ion is provided as a metal nanostructure (e.g., a copper nanoparticle, a silver nanoparticle, etc.).

In certain embodiments, forming the microbial inhibition component comprises heating (e.g., curing, annealing) the microbial inhibition component (e.g., heating the compound of Formula (I) immobilized on the substrate). The microbial inhibition component may be heated to any of a variety of suitable temperatures. In some embodiments, for example, the microbial inhibition component may be heated to a temperature greater than or equal to 50° C., greater than or equal to 100° C., greater than or equal to 110° C., greater than or equal to 120° C., greater than or equal to 130° C., greater than or equal to 140° C., or more. In certain embodiments, the microbial inhibition component is heated to a temperature less than or equal to 150° C., less than or equal to 140° C., less than or equal to 130° C., less than or equal to 120° C., less than or equal to 110° C., less than or equal to 100° C., or less. Combinations of the above recited ranges are also possible (e.g., the microbial inhibition component may be heated to a temperature greater than or equal to 50° C. and less than or equal to 150° C., the microbial inhibition component may be heated to a temperature greater than or equal to 120° C. and less than or equal to 140° C.). Other ranges are also possible.

The microbial inhibition component may be heated to any of the aforementioned temperatures for any or a variety of suitable times. In certain embodiments, for example, the microbial inhibition component is heated (e.g., cured) for greater than or equal to 1 minute, greater than or equal to 5 minutes, greater than or equal to 10 minutes, greater than or equal to 15 minutes, greater than or equal to 30 minutes, greater than or equal to 1 hour, greater than or equal to 5 hours, or more. In some embodiments, the microbial inhibition component is heated for less than or equal to 10 hours, less than or equal to 5 hours, less than or equal to 1 hour, less than or equal to 30 minutes, less than or equal to 15 minutes, less than or equal to 10 minutes, less than or equal to 5 minutes, or less. Combinations of the above recited ranges are also possible (e.g., the microbial inhibition component may be heated for greater than or equal to 1 minute and less than or equal to 10 hours, the microbial inhibition component may be heated for greater than or equal to 10 minutes and less than or equal to 30 minutes). Other ranges are also possible.

In some embodiments, the microbial inhibition component (e.g., the compound of Formula (I)) may be heated to temperatures higher than 150° C. (e.g., greater than 180° C., greater than 200° C., greater than 300° C., or more). Without wishing to be bound by theory, heating the compound of Formula (I) to temperatures higher than 150° C. (e.g., greater than 180° C.) may reduce the metal ion to a metal, in some embodiments, without the use of a reducing agent. For example, upon heating the compound of Formula (I), the metal ion bound to the functional group may be reduced from a cationic oxidation state to a neutral oxidation state (e.g., $Ag^+$ to $Ag^0$). In some embodiments, heating the compound of Formula (I) may result in a free neutral metal (e.g., a nanoparticle, a nanocluster) and a radical-containing functional group (e.g., a thiyl radical, an imidogen radical). As would be understood by a person of ordinary skill in the art, the radical-containing functional groups may dimerize with each other, in some embodiments. In some embodiments, heating the compound of Formula (I) to temperatures higher than 150° C. (e.g., greater than 200° C.) may cause evaporation of the organic components (e.g., the first silane compound), thereby resulting in tempering and/or sintering of the metal ion on and/or into the substrate.

In some embodiments, the method comprises forming a fingerprint inhibition component on at least a second portion of the substrate. According to certain embodiments, forming the fingerprint inhibition component on the substrate comprises depositing a second silane precursor compound on at least a second portion of the substrate. Any of a variety of deposition techniques may be utilized to deposit the second silane precursor compound on at least a second portion of the substrate. In some embodiments, for example, the depositing step comprises spinning (e.g., spin coating), spraying (e.g., spray coating), dipping (e.g., dip coating), wiping, chemical vapor deposition (CVD), or physical vapor deposition (PVD). In certain embodiments, for example, the second silane may be sprayed onto the substrate. In another embodiment, the substrate may be dipped into a solution comprising the second silane. In yet another embodiment, the second silane may be deposited onto the substrate using physical vapor deposition.

In some embodiments, the second silane precursor compound comprises the structure $(R^2O)_3SiR^1$.

In some embodiments, $R^1$ of the second silane precursor compound is selected from the group consisting of —$C_1$-$C_{20}$ alkyl, —$C_2$-$C_{20}$ alkenyl, and —$C_3$-$C_{20}$ alkynyl, any of which may be optionally at least partially halogenated (e.g., fluorinated).

In some embodiments, each $R^2$ of the second silane precursor compound is the same or different and is selected from the group consisting of hydrogen, —$C_1$-$C_{10}$ alkyl, —$C_2$-$C_{10}$ alkenyl, and —$C_3$-$C_{10}$ alkynyl, In some embodiments, each carbon atom and/or hydrogen atom in $R^1$ and $R^2$ is independently optionally substituted with deuterium, halogen, —OH, —CN, —$OR^3$, —$CO_2H$, —C(O)$OR^3$, —C(O)$NH_2$, C(O)NH($C_1$-$C_{10}$ alkyl), —C(O)N($C_1$-$C_{10}$ alkyl)$_2$, $SC_1$-$C_{10}$ alkyl, —S(O)$C_1$-$C_{10}$ alkyl, —$S(O)_2C_1$-$C_{10}$ alkyl, —S(O)NH($C_1$-$C_{10}$ alkyl), —$S(O)_2$NH($C_1$-$C_{10}$ alkyl), —S(O)N($C_1C_{10}$ alkyl)$_2$, —$S(O)_2$N($C_1$-$C_{10}$ alkyl)$_2$, —$NR^3$, —$NH_2$, —$C_2H_8N_2$, —NH($C_1$-$C_{10}$ alkyl), —P($C_1$-$C_{10}$ alkyl)$_2$, —P(O)($C_1$-$C_{10}$ alkyl)$_2$, —$PO_3H_2$, or —Si(—$OC_1$-$C_{10}$ alkyl)$_3$; and In some embodiments, each $R^3$ is selected from the group consisting of hydrogen, deuterium, —$C_1$-$C_{10}$ alkyl, —$C_2$-$C_{10}$ alkenyl, —$C_2$-$C_{10}$ alkynyl, —$C_3$-$C_{10}$ cycloalkyl, and —$C_1$-$C_{10}$ alkyl-O—$C_1$-$C_{10}$ alkyl, optionally substituted.

Any of a variety of suitable second silane precursor compounds may be utilized. In certain embodiments, for example, the second silane precursor compound is selected from the group consisting of chloroundecyl)(triethoxy)silane, (chloroundecyl)(trimethoxy)silane, (chlorohexyl)(triethoxy)silane, (chlorohexyl)(trimethoxy)silane, 3-(chloropropyl)(triethoxy)silane, 2-(chloropropyl)(trimethoxy) silane, 11-(2-methoxyethoxy)undecyltrimethoxysilane, (aminoundecyl)(triethoxy)silane, 11-(chloroundecyl)(triethoxy)silane, 11-(chloroundecyl)(trimethoxy)silane, (aminoundecyl)(trimethoxy)silane, (hydoxydecyl)(triethoxy)silane, (hydoxydecyl)(trimethoxy)silane, (11-undecylinicacid)(triethoxy)silane, (hydroxyheptyl) (triethoxy) silane, (hydroxyundecyl)(triethoxy)silane, and (11-phosphoundecyl)(triethoxy)silane.

Further examples of forming the fingerprint inhibition material are described in U.S. Patent Publication No. 2019/0367773, published on Dec. 5, 2019, filed on May 24, 2019, entitled "Invisible fingerprint coatings and process for forming same", which is incorporated herein by reference in its entirety.

According to certain embodiments, depositing the second silane precursor compound on at least a portion of the substrate provides a second silane compound immobilized on the substrate (e.g., through —Si—O— linkages, as explained herein in further detail).

In some embodiments, the step of forming the microbial inhibition component (e.g., depositing a first silane precursor compound and reacting the first silane with a metal ion) and the step of forming the fingerprint inhibition component (e.g., depositing the second silane precursor compound) are performed substantially simultaneously. In another embodiment, the step of forming the microbial inhibition component (e.g., depositing a first silane precursor compound and reacting the first silane with a metal ion) is performed prior to forming the fingerprint inhibition component (e.g., depositing the second silane precursor compound). In yet another embodiment, the step of forming the fingerprint inhibition component (e.g., depositing the second silane precursor compound) is performed prior to forming the microbial inhibition component (e.g., depositing a first silane precursor compound and reacting the first silane with a metal ion). In yet another embodiment, the first silane precursor compound and the second silane precursor compound are deposited substantially simultaneously, followed by reacting the first silane with a metal ion.

According to certain embodiments, a kit is described, the kit comprising a microbial inhibition component and a fingerprint inhibition component. In some embodiments, the microbial inhibition component comprises a silane compound (e.g., a first silane compound) and a metal ion. The silane compound (e.g., the first silane compound) may comprise a functional group that is configured to bind the meal ion, in some embodiments, such as, but not limited to, a thiol, an amine (e.g., a primary amine, secondary amine, or tertiary amine), a diamine (e.g., ethylene diamine, di-ethylene diamine, tri-ethylene diamine), a triamine, an ethanolamine, a thiourea, or a phosphine functional group. In certain other embodiments, the kit may comprise a microbial inhibition component comprising a silane compound, wherein the silane compound comprises a functional group bound to a metal ion.

The kit may further comprise one or more solutions comprising the microbial inhibition component, and/or the fingerprint inhibition component, in certain embodiments. For example, in some embodiments, the kit may comprise a first solution comprising the first silane compound, a second solution comprising the metal ion, a third solution comprising the invisible fingerprint component, and a fourth solution comprising the anti-fingerprint component. In another embodiment, the kit may comprise a first solution comprising the first silane compound, a second solution comprising the metal ion, and a third solution comprising the fingerprint inhibition component (e.g., the invisible fingerprint component and/or the anti-fingerprint component). In yet another embodiment, the kit may comprise a first solution comprising the microbial inhibition component (e.g., the first silane compound and a metal ion) and a second solution comprising the fingerprint inhibition component (e.g., the invisible fingerprint component and/or the anti-fingerprint component). In yet another embodiment, the kit may comprise a solution comprising the microbial inhibition component and the fingerprint inhibition component (e.g., the invisible fingerprint component and/or the anti-fingerprint component).

According to certain embodiments, an article comprising the anti-microbial coating is described. In some embodiments, for example, the anti-microbial composition may be coated on a substrate comprising a transparent material, such as glass or plastic. According to certain embodiments, the coated substrate may be suitable for use as an article in transportation vehicles and/or equipment. For example, articles for use in transportation vehicles and/or equipment include, but are not limited to, exterior parts of an automobile, aircraft, watercraft, and/or train, such as outer plates, window glass (e.g., windshield, side windows, rear windows, sunroof), mirrors, and/or display panels, and interior parts of an automobile, aircraft, watercraft, and/or train, such as instrument panels. In some embodiments, the coated substrate may be suitable for use as an article in building equipment. For example, articles for use in building equipment include, but are not limited to, furniture, base materials (e.g., glass plates or glass windows for roofs, doors, partitions, and/or greenhouses), transparent plastic plates or windows to be used instead of or in addition to glass, and wall materials (e.g., ceramics, cement, etc.).

In certain embodiments, the anti-microbial composition may be coated on a substrate that is suitable for use in electronic devices. In some embodiments, for example, the anti-microbial composition may be coated onto an electronic component, such as a silicon wafer. According to certain embodiments, the anti-microbial composition may be coated onto an article for use in electronic displays, such as, but not limited to, cell phone screens, computer monitors, television screens, touch screens, appliances, and/or heads up displays.

According to some embodiments, the anti-microbial composition may be coated on a substrate that is suitable for use in glasses (e.g., eyeglasses, sunglasses), masks (e.g., welding masks, surgical masks), and/or clothing (e.g., gloves).

Definitions of specific functional groups and chemical terms are described in more detail below. For purposes of this invention, the chemical elements are identified in accordance with the Periodic Table of the Elements, CAS version, Handbook of Chemistry and Physics, 75th Ed., inside cover, and specific functional groups are generally defined as described therein. Additionally, general principles of organic chemistry, as well as specific functional moieties and reactivity, are described in Organic Chemistry, Thomas Sorrell, University Science Books, Sausalito: 1999, the entire contents of which are incorporated herein by reference.

It will be appreciated that the compounds, as described herein, may be substituted with any number of substituents or functional moieties. In general, the term "substituted" whether preceded by the term "optionally" or not, and substituents contained in formulas of this invention, refer to the replacement of hydrogen radicals in a given structure with the radical of a specified substituent. When more than one position in any given structure may be substituted with more than one substituent selected from a specified group, the substituent may be either the same or different at every position. As used herein, the term "substituted" is contemplated to include all permissible substituents of organic compounds. In a broad aspect, the permissible substituents include acyclic and cyclic, branched and unbranched, carbocyclic and heterocyclic, aromatic and nonaromatic substituents of organic compounds. For purposes of this invention, heteroatoms such as nitrogen may have hydrogen substituents and/or any permissible substituents of organic compounds described herein which satisfy the valencies of the heteroatoms. Furthermore, this invention is not intended to be limited in any manner by the permissible substituents of organic compounds. Combinations of substituents and variables envisioned by this invention are preferably those that result in the formation of stable compounds useful in the anti-fog and anti-fouling applications. The term "stable", as used herein, preferably refers to compounds which possess stability sufficient to allow manufacture and which maintain the integrity of the compound for a sufficient period of time to be detected and preferably for a sufficient period of time to be useful for the purposes detailed herein.

As used herein, "alkyl" refers to a radical of a straight-chain or branched saturated hydrocarbon group having from 1 to 10 carbon atoms ("$C_1$-$C_{10}$ alkyl"). In some embodiments, an alkyl group has 1 to 9 carbon atoms ("$C_1$-$C_9$ alkyl"). In some embodiments, an alkyl group has 1 to 8 carbon atoms ("$C_1$-$C_8$ alkyl"). In some embodiments, an alkyl group has 1 to 7 carbon atoms ("$C_1$-$C_7$ alkyl"). In some embodiments, an alkyl group has 1 to 6 carbon atoms ("$C_1$-$C_6$ alkyl"). In some embodiments, an alkyl group has 1 to 5 carbon atoms ("$C_1$-$C_5$ alkyl"). In some embodiments, an alkyl group has 1 to 4 carbon atoms ("$C_1$-$C_4$ alkyl"). In some embodiments, an alkyl group has 1 to 3 carbon atoms ("$C_1$-$C_3$ alkyl"). In some embodiments, an alkyl group has 1 to 2 carbon atoms ("$C_1$-$C_2$ alkyl"). In some embodiments, an alkyl group has 1 carbon atom ("$C_1$ alkyl"). In some embodiments, an alkyl group has 2 to 6 carbon atoms ("$C_2$-$C_6$ alkyl"). Examples of $C_1$-$C_6$ alkyl groups include methyl ($C_1$), ethyl ($C_2$), n-propyl ($C_3$), isopropyl ($C_3$), n-butyl ($C_4$), tert-butyl ($C_4$), sec-butyl ($C_4$), iso-butyl ($C_4$), n-pentyl ($C_5$), 3-pentanyl ($C_5$), amyl ($C_5$), neopentyl ($C_5$), 3-methyl-2-butanyl ($C_5$), tertiary amyl ($C_5$), and n-hexyl ($C_6$). Additional examples of alkyl groups include n-heptyl ($C_7$), n-octyl ($C_8$) and the like. Unless otherwise specified, each instance of an alkyl group is independently unsubstituted (an "unsubstituted alkyl") or substituted (a "substituted alkyl") with one or more substituents. In certain embodiments, the alkyl group is an unsubstituted $C_1$-$C_{10}$ alkyl (e.g., —$CH_3$). In certain embodiments, the alkyl group is a substituted $C_1$-$C_{10}$ alkyl.

As used herein, the term "alkenyl" includes a radical of a straight-chain or branched saturated hydrocarbon group having from 2 to 10 carbon atoms, and also includes at least one carbon-carbon double bond. It will be understood that in certain embodiments, alkenyl may be advantageously of limited length, including $C_2$-$C_{10}$, $C_2$-$C_9$, $C_2$-$C_8$, $C_2$-$C_7$, $C_2$-$C_6$, $C_2$-$C_5$, $C_2$-$C_4$, and $C_2$-$C_3$.

As used herein, the term "alkynyl" includes a radical of a straight-chain or branched saturated hydrocarbon group having from 3 to 10 carbon atoms, and also includes at least one carbon-carbon triple bond. It will be understood that in certain embodiments, alkenyl may be advantageously of limited length, including $C_3$-$C_{10}$, $C_3$-$C_9$, $C_3$-$C_8$, $C_3$-$C_7$, $C_3$-$C_6$, $C_3$-$C_5$, and $C_3$-$C_4$.

It should be understood that affixing the suffix "-ene" to a group indicates the group is a divalent moiety, (e.g., alkylene is the divalent moiety of alkyl, heteroalkylene is the divalent moiety of heteroalkyl). Affixing the suffice "-yne" to a group indicates the group is trivalent moiety (e.g., alkylyne is the trivalent moiety of alkyl, heteroalkylyne is the trivalent moiety of heteroalkyl).

As used herein, the term "halogen" refers to fluorine (fluoro, —F), chlorine (chloro, —Cl), bromine (bromo, —Br), or iodine (iodo, —I).

As used herein, the term "hydroxy" or "hydroxyl" refers to an —OH group.

As used herein, the term "alkoxy" refers to an —O-(alkyl) or an —O-(cycloalkyl) group. Representative alkoxy group examples include, but are not limited to, methoxy, ethoxy, propoxy, butoxy, cyclopropyloxy, cyclobutyloxy, cyclopentyloxy, and the link.

As understood from the above, alkyl, alkylene, and alkylyne groups, as defined herein, are, in certain embodiments, optionally substituted. Optionally substituted refers to a group which may be substituted or unsubstituted (e.g., "substituted" or "unsubstituted" alkyl). In general, the term "substituted" means that at least one hydrogen present on a group is replaced with a permissible substituent (e.g., a substituent which upon substitution results in a stable compound, such as a compound which does not spontaneously undergo transformation such as by rearrangement, cyclization, elimination, or other reaction).

Unless otherwise indicated, a "substituted" group has a substituent at one or more substitutable positions of the group, and when more than one position in any given structure is substituted, the substituent is either the same or different at each position. The term "substituted" is contemplated to include substitution with all permissible substituents of organic compounds, and includes any of the substituents described herein that results in the formation of a stable compound. The present invention contemplates any and all such combinations in order to arrive at a stable compound. For purposes of this invention, heteroatoms such as nitrogen may have hydrogen substituents and/or any suitable substituent as described herein which satisfy the valencies of the heteroatoms and results in the formation of a stable moiety.

The following examples are intended to illustrate certain embodiments of the present invention, but do not exemplify the full scope of the invention.

EXAMPLE 1

Figure 2A:
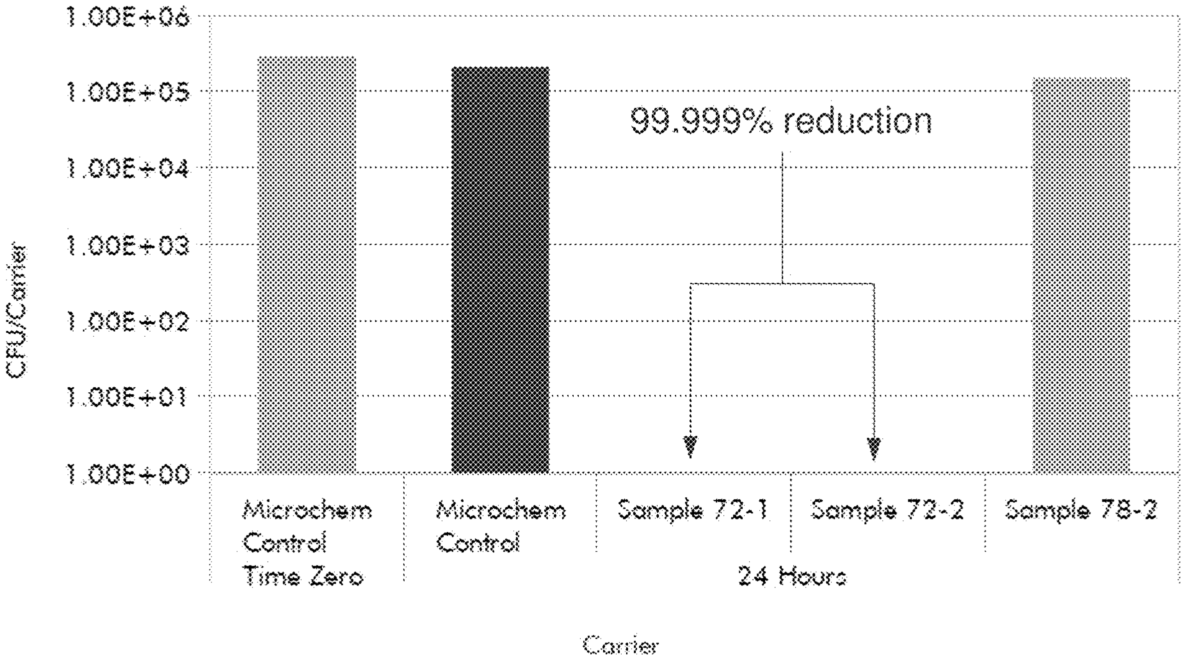
FIG. 2A shows, according to some embodiments, the microbial inhibition of *Escherichia coli* using anti-microbial compositions.
Figure 2B:
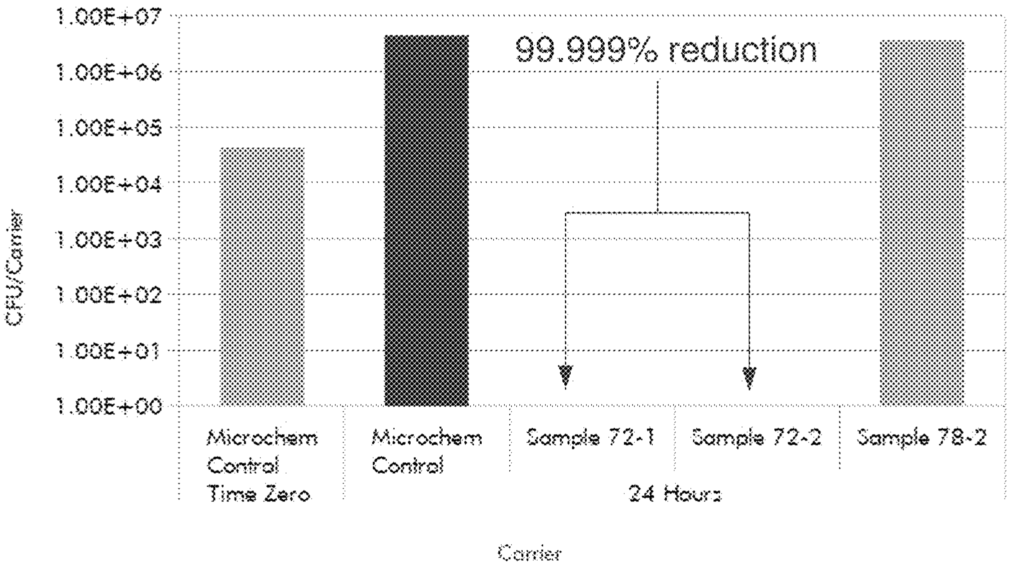
FIG. 2B shows, according to some embodiments, the microbial inhibition of *Staphylococcus aureus* using anti-microbial compositions.

An anti-microbial coating was provided by depositing 11-mercaptoundecyl triethoxysilane and 11-chloroundecyl (triethoxy)silane on a glass substrate in a 4:1 ratio by weight percent. After deposition, the 11-mercaptoundecyl triethoxysilane component was reacted with silver nitrate (Sample 72-1). Sample 72-1 showed a 99.999% reduction in *E. coli* and *S. aureus*, as shown in FIGS. 2A and 2B, respectively. Note that Sample 78-2 is a comparative quaternary ammonium salt.

EXAMPLE 2

Figure 3:
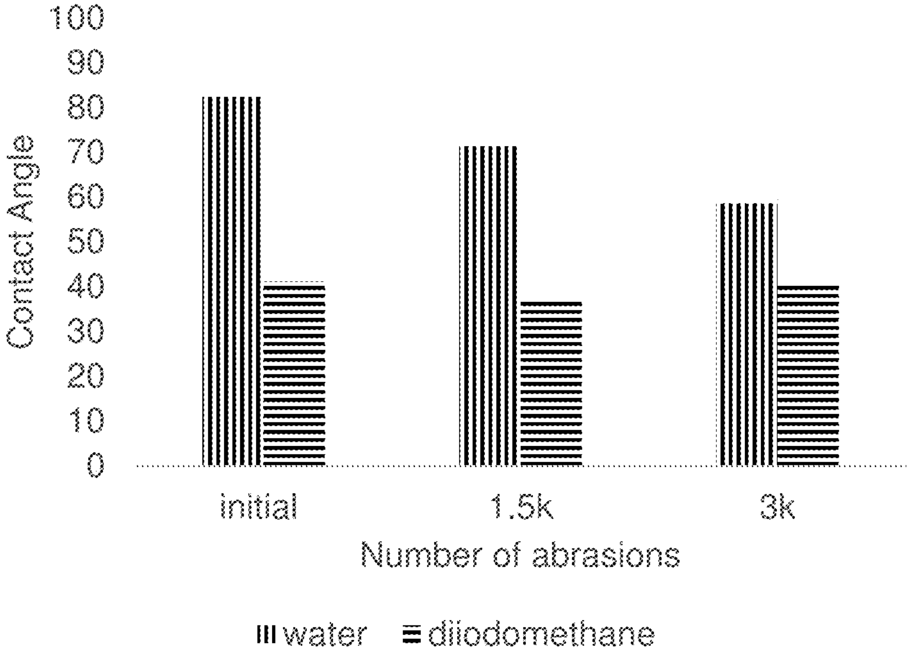
FIG. 3 shows, according to some embodiments, the durability of an anti-microbial composition after a number of abrasions.

An anti-microbial coating was provided by depositing 11-mercaptoundecyl triethoxysilane and 11-chloroundecyl (triethoxy)silane on a glass substrate in a 1:4 ratio by weight percent. No side reactions occur between 11-mercaptoundecyl triethoxysilane and 11-chloroundecyl(triethoxy)silane, as assessed by $^1$-HNMR and $^{13}$C-NMR. After deposition, the 11-mercaptoundecyl triethoxysilane component was reacted with silver nitrate (Sample 72-2). Sample 72-2 showed a 99.999% reduction in *E. coli* and *S. aureus*, as shown in FIGS. 2A and 2B, respectively. The durability of the anti-microbial coating was evaluated using a linear abrasion test. The surface of the coating was abraded using an eraser. The water and diiodomethane contact angles were measured before abrading, after 1,500 abrasions, and after 3,000 abrasions, as shown in FIG. 3. Note that Sample 78-2 is a comparative quaternary ammonium salt.

EXAMPLE 3

An anti-microbial coating was provided by depositing 11-(2-aminoethyl)aminoundecyl triethoxysilane and 11-chloroundecyl(triethoxy)silane on a glass substrate in a 1:4 ratio by weight percent. No side reactions occur between 11-mercaptoundecyl triethoxysilane and 11-chloroundecyl (triethoxy)silane, as assessed by $^1$H-NMR and $^{13}$C-NMR.

After deposition, the 11-(2-aminoethyl)aminoundecyl triethoxysilane was reacted with copper chloride.

EXAMPLE 4

A first anti-microbial coating was provided by depositing 11-chloroundecyl(triethoxy)silane and ethylenediamine on a glass substrate in a 4:1 ratio by weight percent and reacting the coating with a 0.2 M copper salt solution at pH 2. As shown in FIG. 4A, the coating showed a greater than 99.9% reduction in *Escherichia coli* ATCC 8739. A second anti-microbial coating was provided by depositing 11-chloroundecyl(triethoxy)silane and ethylenediamine on a glass substrate in a 4:1 ratio by weight percent and reacting the coating with a 0.2 M copper salt solution at pH 4. As shown in FIG. 4B, the coating showed a greater than 99.9% reduction in *Escherichia coli* ATCC 8739.

EXAMPLE 5

A first anti-microbial coating was provided by depositing 11-chloroundecyl(triethoxy)silane and tris-ethylenediamine on a glass substrate in a 4:1 ratio by weight percent and reacting the coating with a 0.01 M copper salt solution. As shown in FIG. 5A, the coating showed a greater than 99.9% reduction in *Escherichia coli* ATCC 8739. A second anti-microbial coating was provided by depositing 11-chloroundecyl(triethoxy)silane and 6-mercaptopyridine-2,3-dicarboxylic acid on a glass substrate in a 4:1 ratio by weight percent and reacting the coating with a 0.01 M copper salt solution. As shown in FIG. 5B, the sample showed a greater than 99.9% reduction in *Escherichia coli* ATCC 8739.

EXAMPLE 6

The contact angles and surface energies of several fingerprint inhibition coatings comprising an anti-fingerprint material were determined. As shown in FIGS. 6A and 6B, a perfluoropolyether silane compound with a molecular weight greater than 1,000 and an ethylene-diamine tri-alkoxy silane compound were combined in various different ratios and deposited on a glass surface. The water contact angle, diiodomethane contact angle, surface energy, and gloss of each of the corresponding coatings were measured.

EXAMPLE 7

Figure 7A:
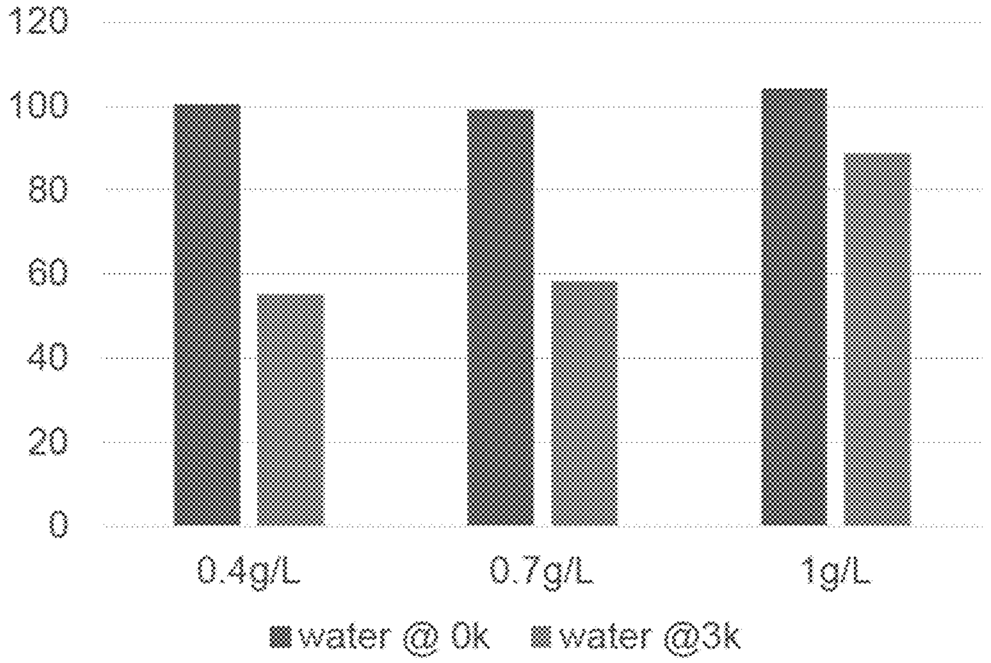
FIGS. 7A-7B show, according to some embodiments, the durability of an anti-microbial and anti-fingerprint composition after a number of abrasions.
Figure 7B:
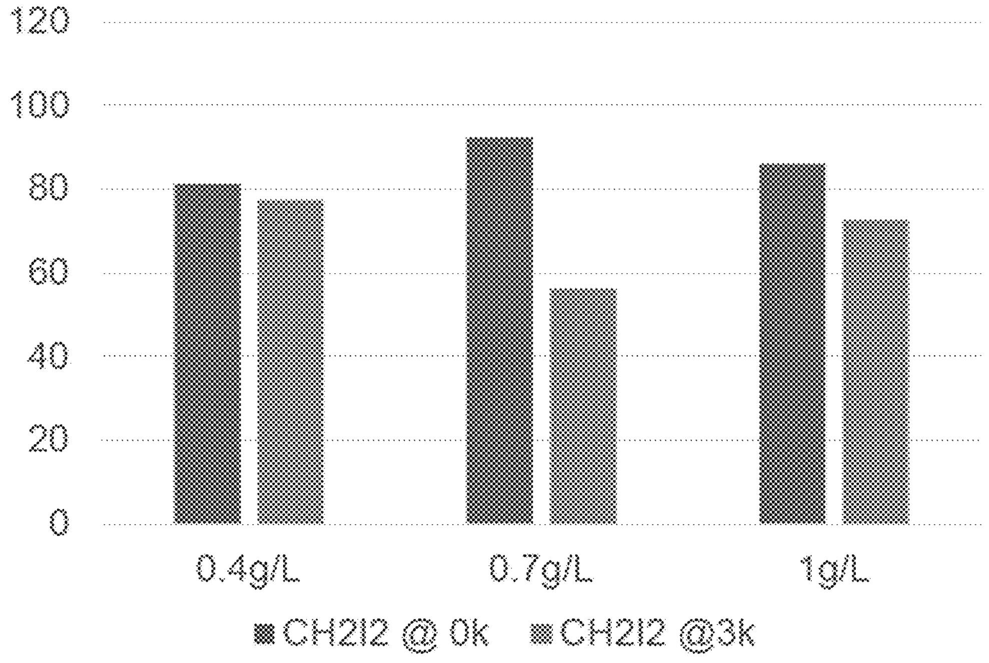

The durability of several anti-microbial coatings were determined. A perfluoropolyether silane compound and an ethylene-diamine tri-alkoxy silane compound were combined in an 8:1 ratio by weight percent in a solution of Novec7200:ethanol in a 1:3 ratio by volume percent with varying acid concentrations of 0.4 g/L, 0.7 g/L, and 1 g/L. Each material was deposited on its own glass substrate. After deposition, the coatings were reacted with a 0.05 M copper salt solution. The durability of the anti-microbial coatings were evaluated using a linear abrasion test. The surface of the coatings was abraded using an eraser. The water and diiodomethane contact angles were measured for each coating before abrading and after 3,000 abrasions, as shown in FIGS. 7A and 7B. The initial water contact angle was greater than 100 degrees, and the initial diiodomethane angle was greater than 70 degrees.

While several embodiments of the present invention have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present invention. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present invention is/are used. Those skilled in the art will recognize, or be able to ascertain using no more than routine experimentation, many equivalents to the specific embodiments of the invention described herein. It is, therefore, to be understood that the foregoing embodiments are presented by way of example only and that, within the scope of the appended claims and equivalents thereto, the invention may be practiced otherwise than as specifically described and claimed. The present invention is directed to each individual feature, system, article, material, and/or method described herein. In addition, any combination of two or more such features, systems, articles, materials, and/or methods, if such features, systems, articles, materials, and/or methods are not mutually inconsistent, is included within the scope of the present invention.

In cases where the present specification and a document incorporated by reference include conflicting and/or inconsistent disclosure, the present specification shall control. If two or more documents incorporated by reference include conflicting and/or inconsistent disclosure with respect to each other, then the document having the later effective date shall control.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Other elements may optionally be present other than the elements specifically identified by the "and/or" clause, whether related or unrelated to those elements specifically identified unless clearly indicated to the contrary. Thus, as a non-limiting example, a reference to "A and/or B," when used in conjunction with open-ended language such as "comprising" can refer, in one embodiment, to A without B (optionally including elements other than B); in another embodiment, to B without A (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. An anti-microbial coating, comprising:

a first silane compound comprising a functional group bound to a metal ion, wherein the functional group is a diamine; and a second silane compund that is different from the first silane compound, wherein at least the first silane compound has antimicrobial properties, wherein the first silane compound and the second silane compound are each immobilized on a substrate through —Si—O—linkages, wherein the oxygen atom of the —Si—O— linkages is bound to the sbustrate, wherein the substrate is a glass substrate, a metal substrate, and/or a ceramic substrate, and wherein (i) the second silane compound does not comprise a metal ion; and/or (ii) the second silane compound comprises the structure:

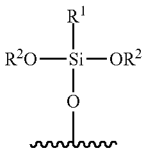

wherein:

$R^1$ is selected from the group consisting of —$C_1$-$C_{20}$ alkyl, —$C_2$-$C_{20}$ alkenyl, and —$C_3$-$C_{20}$ alkynyl, any of which may optionally be at least partially halogenated;

each $R^2$ is the same or different and is a linkage to the substrate or is selected from the group consisting of hydrogen, —$C_1$-$C_{10}$ alkyl, —$C_2$-$C_{10}$, alkenyl, and —$C_3$-$C_{10}$ alkynyl, wherein each carbon atom and/or hydrogen atom in $R^1$ and $R^2$ is independently optionally substituted with deuterium, a halogen, —OH, —CN, —$OR^3$, —$CO_2H$, —$C(O)OR^3$, —$C(O)NH_2$, —C(O)NH($C_1$-$C_{10}$ alkyl), —C(O)N($C_1$-$C_{10}$ alkyl)$_2$, —$SC_1$-$C_{10}$ alkyl, —S(O)$C_1$-$C_{10}$ alkyl, —$S(O)_2C_1$-$C_{10}$ alkyl, —S(O)NH($C_1$-$C_{10}$ alkyl), —$S(O)_2NH$($C_1$-$C_{10}$ alkyl), —S(O)N($C_1C_{10}$ alkyl)$_2$, —$S(O)_2N$($C_1$-$C_{10}$ alkyl)$_2$, —$NR^3$, —$NH_2$, —$C_2H_8N_2$, —NH($C_1$-$C_{10}$ alkyl), —P($C_1$-$C_{10}$ alkyl)$_2$, —P(O)($C_1$-$C_{10}$ alkyl)$_2$, —$PO_3H_2$, or —Si(—$OC_1$-$C_{10}$ alkyl)$_3$; and each $R^3$ is selected from the group consisting of hydrogen, deuterium, —$C_1$-$C_{10}$ alkyl, —$C_2$-$C_{10}$ alkenyl, —$C_2$-$C_{10}$ alkynyl, —$C_3$-$C_{10}$ cycloalkyl, and —$C_1$-$C_{10}$ alkyl-O—$C_1$-$C_{10}$ alkyl, optionally substituted.

2. The anti-microbial coating of claim 1, wherein the metal ion is silver.

3. The anti-microbial coating of claim 1, wherein the metal ion is copper.

4. The anti-microbial coating of claim 1, wherein the anti-microbial coating has a greater than or equal to 99% reduction in retention of a microbe after the anti-microbial coating is exposed to the microbe.

5. An article comprising:

the anti-microbial coating of claim 1.

6. The antimicrobial coating of claim 1, wherein the functional group is ethylene diamine, di-ethylene diamine, or tri-ethylene diamine.

7. The antimicrobial coating of claim 4, wherein the microbe is of the genus *Escherichia, Staphylococcus, Streptococcus, Listeria, Enterococcus, Salmonella*, and/or *Pseudomonas*.

8. The antimicrobial coating of claim 7, wherein the microbe comprises *Escherichia coli* and/or *Staphylococcus aureus*.

9. The anti-microbial coating of claim 1, wherein the metal substrate is not a metal oxide substrate.

10. The article of claim 5, wherein the article is a cell phone, a computer monitor, a television screen, a touch screen, an appliance, a transportation vehicle, or building equipment.

11. The anti-microbial coating of claim 1, wherein the second silane compound has invisible fingerprint and/or anti-fingerprint properties.

* * * * *